(12) United States Patent
Metelsky et al.

(10) Patent No.: US 10,357,837 B2
(45) Date of Patent: Jul. 23, 2019

(54) CUTTER BUILD AND TRUING MACHINE

(71) Applicant: THE GLEASON WORKS, Rochester, NY (US)

(72) Inventors: Alan S. Metelsky, Rochester, NY (US); Craig A. VanHarken, Canandaigua, NY (US)

(73) Assignee: THE GLEASON WORKS, Rochester, NY (US)

( * ) Notice: Subject to any disclaimer, the term of this patent is extended or adjusted under 35 U.S.C. 154(b) by 255 days.

(21) Appl. No.: 15/531,008

(22) PCT Filed: Dec. 14, 2015

(86) PCT No.: PCT/US2015/065553
§ 371 (c)(1),
(2) Date: May 26, 2017

(87) PCT Pub. No.: WO2016/100208
PCT Pub. Date: Jun. 23, 2016

(65) Prior Publication Data
US 2017/0355031 A1    Dec. 14, 2017

Related U.S. Application Data

(60) Provisional application No. 62/221,812, filed on Sep. 22, 2015, provisional application No. 62/093,782, filed on Dec. 18, 2014.

(51) Int. Cl.
*B23F 9/08*    (2006.01)
*B23F 9/10*    (2006.01)
(Continued)

(52) U.S. Cl.
CPC ............ *B23F 23/12* (2013.01); *B23F 21/226* (2013.01); *B23P 15/34* (2013.01); *B23P 19/04* (2013.01);
(Continued)

(58) Field of Classification Search
CPC ...... B23F 21/22; B23F 21/223; B23F 21/226; B23F 21/23; B23F 21/233; B23F 21/236;
(Continued)

(56) References Cited

U.S. PATENT DOCUMENTS 273,022 A * 2/1883 Buss .................. B23Q 17/2225
33/634
304,389 A * 9/1884 Willey et al. ...... B23Q 17/2225
33/635
(Continued)

FOREIGN PATENT DOCUMENTS

DE    202005004287 U1    5/2005

OTHER PUBLICATIONS

International Search Report and Written Opinion for PCT/US2015/065553, ISA/EPO, Apr. 5, 2016, 12 pgs.

*Primary Examiner* — Jason L Vaughan
(74) *Attorney, Agent, or Firm* — Robert L. McDowell (57) ABSTRACT

A cutter build and truing machine (22) comprising a mechanism (52, 54) to position cutting blades (98) by moving the blades in either direction in a mounting slot (96) of a cutter head (94). The machine further includes a torque spindle (62) and driver (66) to automatically tighten or loosen clamp bolts (102).

20 Claims, 8 Drawing Sheets

(51) Int. Cl.
*B24B 3/06* (2006.01)
*B23F 21/22* (2006.01)
*B23F 23/12* (2006.01)
*B23P 15/34* (2006.01)
*B23P 19/04* (2006.01)

(52) U.S. Cl.
CPC ............... *B24B 3/06* (2013.01); *B23F 9/082* (2013.01); *B23F 9/10* (2013.01)

(58) Field of Classification Search
CPC ...... B24B 3/06; B23Q 17/22; B23Q 17/2225; B23Q 17/2233; B23Q 17/2216; B23Q 17/0923; B23Q 17/0942; B23C 5/2204; B23C 5/2208; B23C 5/2234; B23C 5/2239; B23C 5/2243; B23C 5/226; B23C 2245/08; B23C 2270/08; Y10T 29/53061; Y10T 29/53807; B23P 19/06; B23P 15/28; B23P 15/30; B23P 15/34; B23P 15/36
USPC ....... 407/21–22; 76/101.1; 33/633, 634, 635
See application file for complete search history.

(56) References Cited

U.S. PATENT DOCUMENTS

| | | | | |
|---|---|---|---|---|
| 536,103 A * | 3/1895 | Snyder et al. | ..... | B23Q 17/2225 33/635 |
| 602,778 A * | 4/1898 | Shimer | ............. | B23Q 17/2225 33/635 |
| 660,005 A * | 10/1900 | Davis | ................. | B23Q 17/2225 33/635 |
| 691,331 A * | 1/1902 | Wise | .................. | B23Q 17/2225 33/635 |
| 809,037 A * | 1/1906 | Walker | ............... | B23Q 17/2225 33/635 |
| 836,847 A * | 11/1906 | Whitener | ........... | B23Q 17/2225 33/635 |
| 1,026,136 A * | 5/1912 | Watkins | ............. | B23Q 17/2225 33/635 |
| 1,042,280 A * | 10/1912 | Salmer | ............... | B23Q 17/2225 33/634 |
| 1,836,662 A * | 12/1931 | Head | ....................... | B23F 21/22 33/501.18 |
| 1,949,014 A * | 2/1934 | Gleason | ............. | B23Q 17/2225 33/501.14 |
| 2,496,800 A * | 2/1950 | Larkins | .............. | B23Q 17/2225 144/130 |
| 2,506,082 A * | 5/1950 | Hartman | ................ | B23F 21/226 29/404 |
| 3,099,883 A * | 8/1963 | Bergemann | ............. | B23F 23/12 33/201 |
| 5,020,228 A * | 6/1991 | Hessenthaler | ...... | B23Q 17/2225 33/201 |
| 5,033,201 A * | 7/1991 | Hinkle | ................ | B23Q 17/2225 33/633 |
| 5,839,943 A | 11/1998 | Stadtfeld | | |
| 5,857,812 A * | 1/1999 | Stahl | ................. | B23B 29/03432 33/634 |
| 7,428,784 B1 * | 9/2008 | Antonello | .......... | B23Q 17/2225 33/628 |
| 7,431,544 B2 * | 10/2008 | Ribbeck | .................... | B23C 5/22 407/29 |

\* cited by examiner

CUTTER BUILD AND TRUING MACHINE

FIELD OF THE INVENTION

The invention relates to cutting tools for the production of bevel gears and in particular to a machine for the building and/or truing of stick blade cutter heads.

BACKGROUND OF THE INVENTION

In the manufacture of bevel and hypoid gears with curved flank lines, the cutting tools utilized are primarily face mill or face hob cutters, such types of cutting tools are well known in the art of gear manufacture. In face mill cutters, the cutting blades are arranged about the face of the cutter head in a circle such that one tooth slot is formed with each plunge of the cutter and the cutter must be withdrawn and the workpiece indexed to the next tooth slot position in order to form the next tooth slot. In face hob cutters, cutting blades are arranged about the face of the cutter head in groups with each successive blade group cutting a successive tooth slot such that with a single plunge of the cutting tool, and accompanying rotation of the workpiece in a timed relationship with the cutting tool, all tooth slots of the workpiece are formed.

Cutting tools for face mill and face hob processes usually consist of disk-shaped cutter heads with stick-type (also known as bar-type) cutting blades, made from bar stock tool steel or carbide for example, which are inserted into and positioned in mounting slots (i.e. slots) formed in the cutter heads. The slots generally extend between the opposed faces of the cutter head and may be oriented parallel to the cutter axis of rotation or at a predetermined angle thereto. Each cutting blade comprises a front rake face, cutting edge, a cutting side surface oriented at a predetermined relief angle, clearance edge, clearance side surface, and a top surface. Examples of inserted stick-type cutter heads and blades are shown in U.S. Pat. No. 4,575,285 to Blakesley, U.S. Pat. No. 4,621,954 to Kitchen et al. and U.S. Pat. No. 5,890,846 to Clark et al.

The disk-shaped cutter head body is divided into blade groups or "starts" with each blade group containing one to three slots. In the case of one slot per group, the cutter may form the entire tooth slot, or the cutter is dedicated to cut only the convex or concave tooth flanks of a workpiece usually as a finishing operation. In the case of two slots per blade group, there is an inner and outer cutting blade located in each group for cutting the convex and concave sides of a tooth slot. Such a cutter head can be designed as a roughing cutter, a finishing cutter, or a "completing" cutter which roughs out the tooth slot and finishes convex and concave tooth flanks at the same time. In the case of three slots per blade group, the additional cutting blade is usually a "bottom" or roughing blade. The bottom blade can be arranged as an inner or outer blade (convex or concave cutting, respectively). With this shape, the third blade reams out the root fillet of the tooth slot and supports the cutting action of one of the two other blades.

In building a cutter, cutting blades are inserted into the appropriate slots of a cutter head and are then trued by positioning each blade at a certain uniform blade height relative to the cutter head. This may be done by moving a blade along the lengthwise direction of the slot until a predetermined distance (i.e. height), such as from the blade tip to a reference location on the cutter head, is attained. Once the desired height is achieved, the cutting blade is clamped via a clamping mechanism which usually comprises one or more clamping screws exerting force which directly or indirectly presses and holds the cutting blade in position in its respective slot. It should be noted that when building the cutter, the inserted blades may be clamped with a holding force which is just sufficient to prevent each blade from falling from its respective slot. For truing, the holding force is lessened by an amount whereby the blades are movable for truing.

In some instances, a uniform radial location of the cutting edges of the cutting blades is the most important aspect of a cutter. This may be determined by a truing procedure wherein the cutting blades are first axially positioned to a uniform height with respect to the cutter head. The cutting edge of each blade is then located by a probe (contacting or non-contacting type) to determine the radial location of a same predetermined point on each cutting edge. The radii differences between the blades are used to calculate a value to move the blades in either direction (plus/minus) in the lengthwise direction of the slot thereby effecting a radial shift in the position of the cutting edge with the result being all cutting edges following essentially the same path as the cutter is rotated about its axis. The axial location (i.e. height) uniformity of the end point of the cutting blades is lost due to the axial adjustment necessary to effect the cutting edge shift. However, the differences in the heights of the blade tips usually remain within pre-set tolerances.

In the cutter truing machine of U.S. Pat. No. 5,839,943, it is disclosed to push a cutting blade in the lengthwise slot direction until a stop surface is encountered by the tip of the cutting blade thus establishing a uniform height for all cutting blades in a cutter head. However, the impact of the blade tip with the stop surface may result in damage to the cutting blade. Furthermore, if the stop surface is not correctly set and the desired blade height is exceeded, the machine is incapable of moving the cutting blade in the opposite direction along the slot.

In the cutter truing machine of U.S. Pat. No. 6,568,884, truing is effected by a stable arm having a push head for pushing on a cutting blade so as to move the cutting blade in the direction of its respective slot in a cutter head and a probe for measuring the height of each cutting blade relative to the cutter head. However, if the desired amount of blade movement is exceeded, the machine is incapable of moving the cutting blade in the opposite direction along the slot since the push head is capable of pushing the blades only in one direction. Also, with the probe and push head both mounted on the same arm, high pushing forces may affect the fragile mechanisms of the arm.

SUMMARY OF THE INVENTION

The invention is directed to a cutter build and truing machine comprising a mechanism to position cutting blades by moving the blades in either direction in a mounting slot of a cutter head. The machine further includes a torque system to automatically tighten or loosen clamp bolts.

DETAILED DESCRIPTION OF THE PREFERRED EMBODIMENT

The terms "invention," "the invention," and "the present invention" used in this specification are intended to refer broadly to all of the subject matter of this specification and any patent claims below. Statements containing these terms should not be understood to limit the subject matter described herein or to limit the meaning or scope of any patent claims below. Furthermore, this specification does not seek to describe or limit the subject matter covered by any claims in any particular part, paragraph, statement or drawing of the application. The subject matter should be understood by reference to the entire specification, all drawings and any claim below. The invention is capable of other constructions and of being practiced or being carried out in various ways. Also, it is understood that the phraseology and terminology used herein is for the purposes of description and should not be regarded as limiting.

The use of "including", "having" and "comprising" and variations thereof herein is meant to encompass the items listed thereafter and equivalents thereof as well as additional items.

The details of the invention will now be discussed with reference to the accompanying drawings which illustrate the invention by way of example only. In the drawings, similar features or components will be referred to by like reference numbers. Although references may be made below to directions such as upper, lower, upward, downward, rearward, bottom, top, front, rear, etc., in describing the drawings, there references are made relative to the drawings (as normally viewed) for convenience. These directions are not intended to be taken literally or limit the present invention in any form.

Figure 1:
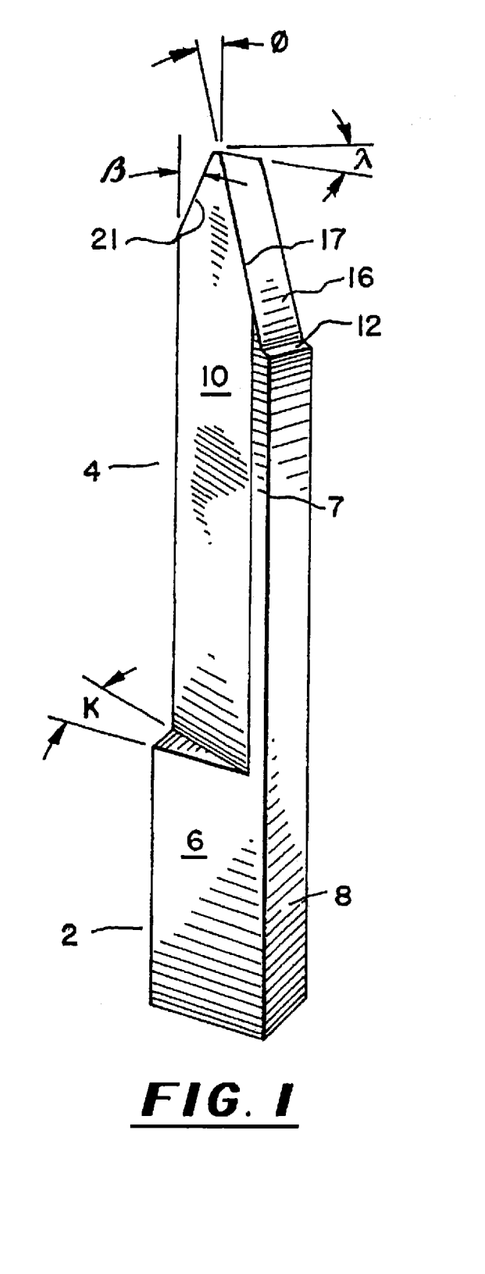
FIG. 1 is an isometric view of a stick-type cutting blade.
Figure 2:
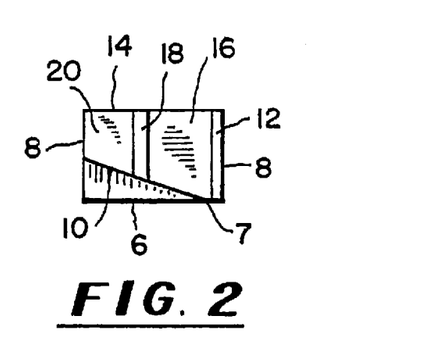
FIG. 2 is a top view of the cutting blade of FIG. 1.

FIGS. 1 and 2 illustrate a known type of stick-type cutting blade formed from a length of bar stock material such as high speed steel or carbide, for example. The cutting blades may include a wear coating which is known in the art. The cutting blade comprises a base portion 2 and a cutting end portion 4. The base portion 2 includes a front face 6. Side surfaces 8 and back surface 14 extend the length of the cutting blade.

Cutting end portion 4 comprises a narrow front surface 7 which is an extension of base front face 6, rake face 10 oriented at a predetermined rake angle K, shoulder 12, pressure side surface 16, top surface 18 and clearance side surface 20. Cutting edge 17 is defined by the intersection of pressure side surface 16 and rake face 10 while clearance edge 21 is defined by the intersection of clearance side surface 20 and rake face 10. Top surface 18 is relieved from front to back as shown by angle λ, cutting edge 17 is oriented at pressure angle φ with respect to side 8, and clearance edge 21 is oriented at clearance angle β with respect to side 8.

While the cutting blade of FIG. 1 comprises a generally rectangular cross-section, stick-type cutting blades may have other cross-sectional shapes including square, five or more sided, round and partially-round. Additionally, some stick-type cutting blades are known to additionally include a slot extending at least partially along the length of the front face of the blade and intersecting the clearance edge near the blade tip so as to form a secondary cutting edge to assist with cutting the bottom portion of a tooth slot.

Figure 3:
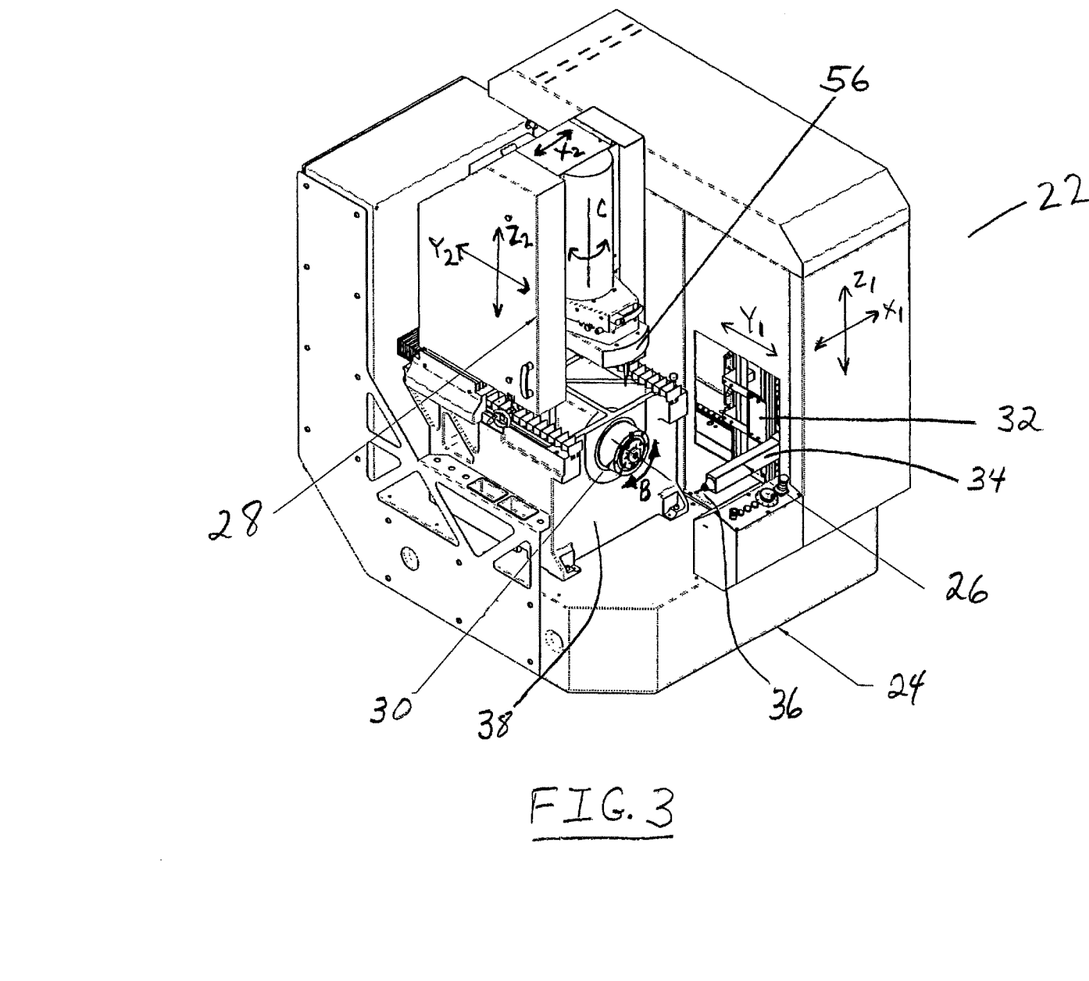
FIG. 3 is an isometric view of the inventive cutter build and truing machine.

The invention comprises a machine for building and truing of stick blade cutter heads for bevel gear production. FIG. 3 shows the inventive cutter build and truing machine 22 comprising a machine base 24, preferably made of granite or cast iron, upon which is mounted two primary subsystems, a measurement subsystem 26, and a cutter head spindle and build carriage subsystem 28 having a cutter head spindle 30.

The measurement subsystem 26 provides a computer controlled three-axis ($X_1$, $Y_1$, $Z_1$) motion platform 32 with a measurement arm 34 and a touch probe 36 for measuring. Measurements are derived from axis positions and deflection of the probe 36, preferably a 3D scanning probe, located at the end of measurement arm 34. Any machine tool computer control capable of simultaneous linear and/or rotational/angular control of multiple machine axes may be utilized for the inventive machine. Suitable examples being computer controls from B&R Automation, Fanuc or Siemens.

The cutter head spindle 30 and build carriage subsystem 28 is provided to mount and index a cutter head and to deliver the blade positioning and clamp screw torqueing systems to their required positions. The spindle 30 is mounted in a casting 38 affixed to the base 24 and the cutter head spindle and build carriage 28 is mounted to the top of the spindle casting 38. Hence, spindle 30 is positioned between base 24 and build carriage 28. The spindle 30 is computer controlled and is rotatable and indexable about a spindle axis (B) and preferably comprises a low speed, direct drive arrangement with a precision encoder (not shown) to enable accurate indexing. The spindle 30 may be fitted with a mechanical brake (not shown) to allow for cutter bolt torqueing and to prevent rotation of unbalanced loads on loss of power.

Figure 4:
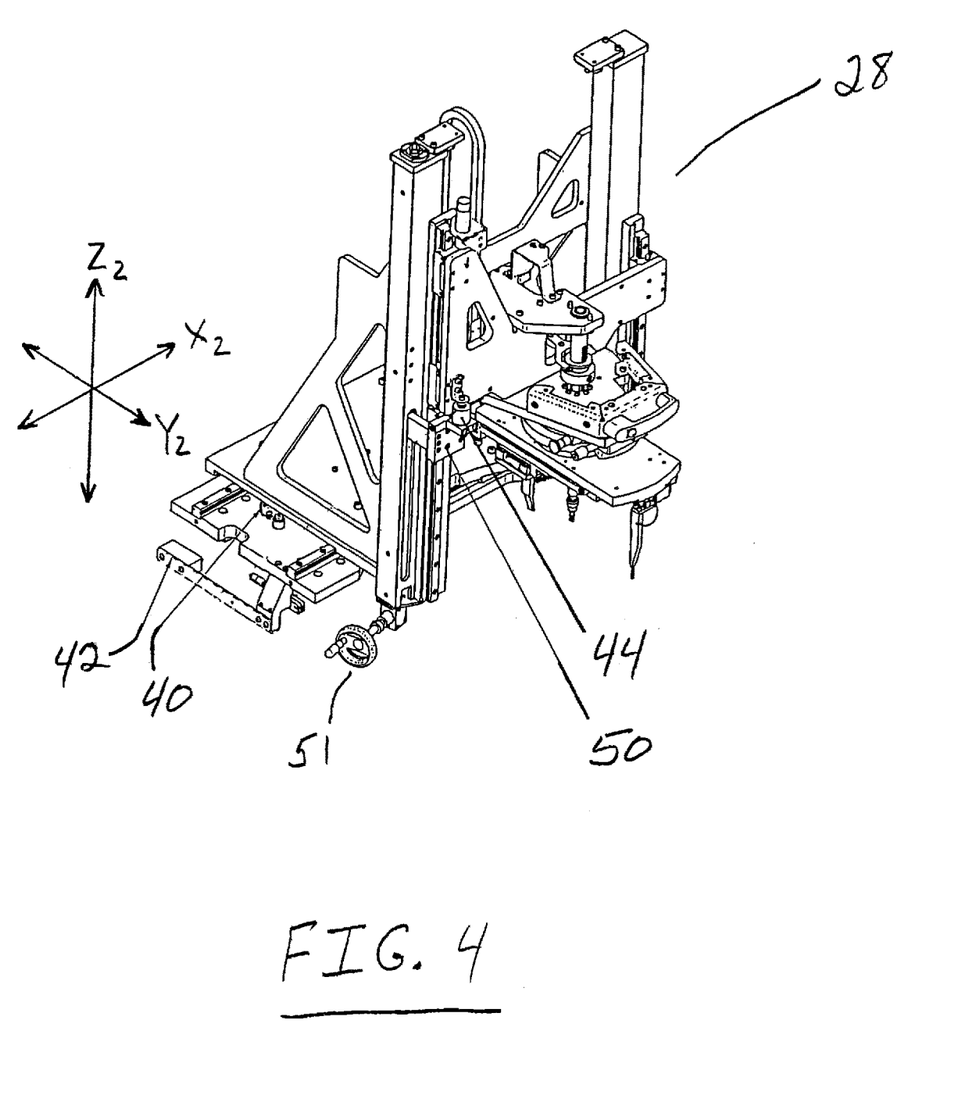
FIG. 4 is a front view of the build carriage portion of the machine.
Figure 5:
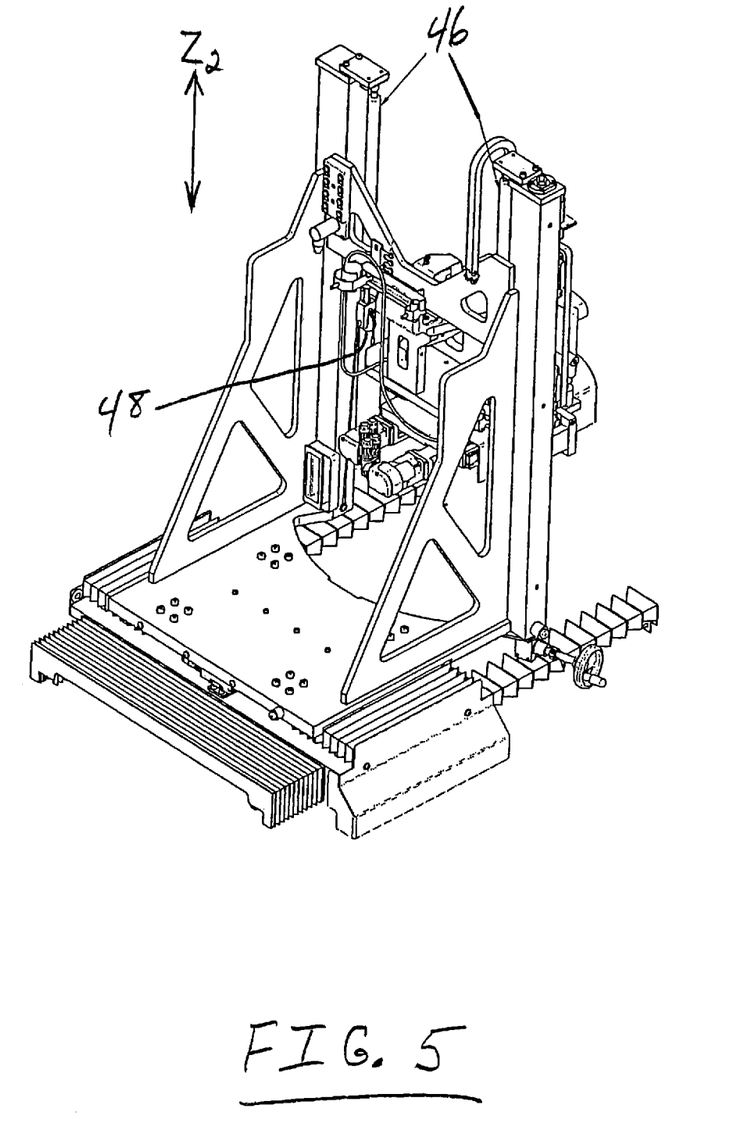
FIG. 5 is a rear view of the build carriage portion of the machine.

As seen in FIG. 4, the build carriage 28 is preferably an unpowered, manually positioned, four-axis ($X_2$, $Y_2$, $Z_2$, C) motion platform with brakes 40, 42, 44, preferably electromagnetic, to hold the respective linear axes $X_2$, $Y_2$, $Z_2$ in a desired (e.g. working) position. The electromagnetic brakes on the $X_2$ and/or $Y_2$ axes may be engaged by the control computer to act as a positioning aid, stopping axis motion at a required or desired location. As best seen in FIG. 5, the vertical axis $Z_2$ motion is preferably counterbalanced such as by gas springs 46, or torsion springs, acting through a cable and pulley assembly 48, for example, although alternate counterbalancing systems are also contemplated such as one or more counterweights. The $X_2$, $Y_2$, and C axes preferably include absolute position feedback via respective linear and rotary encoders (not shown). The $Z_2$ axis motion is preferably limited by a hard stop 50 that is fitted with position feedback (not shown) and which, preferably, is manually adjusted such as by a hand wheel 51 although computer controlled adjusting is also contemplated.

The C axis (FIG. 6) is used to align blade positioning arms 52, 54 (mounted to C-axis swivel plate 56) to a correct inclination angle matching the inclination angle of a cutting blade and includes a manual locking clamp 58. When unlocked, the C axis (and thus the arms 52, 54) can be rotated through a predetermined angle, such as plus or minus 25 degrees from the spindle axis B, for example. Once the locking clamp 58 is engaged, a fine adjust knob 60 allows for precision rotation about the C axis, such as plus or minus 2.5 degrees, for example.

Figure 6:
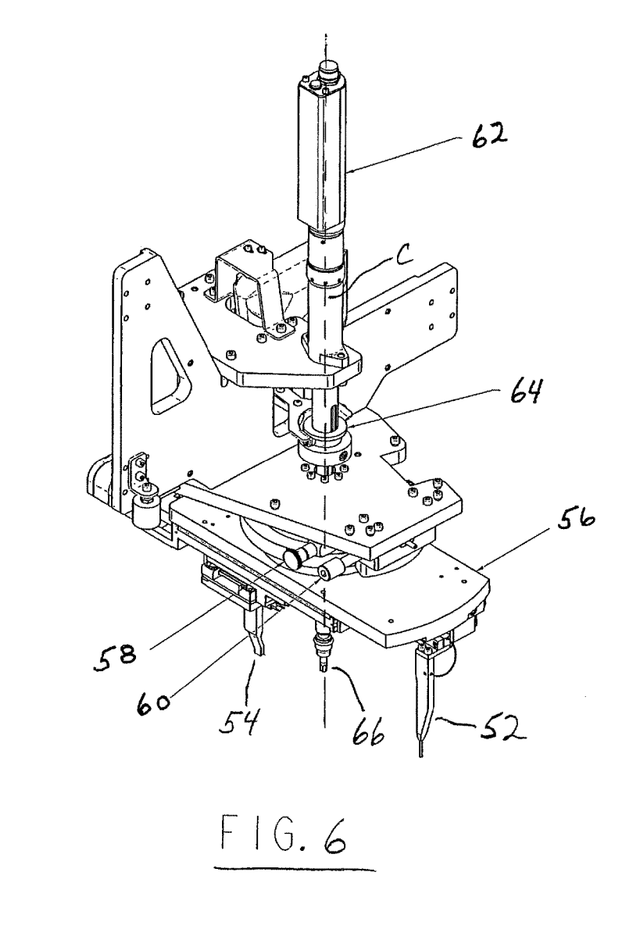
FIG. 6 illustrates the swivel plate and torque spindle of the machine.

At the center of the C axis is an automated torque spindle 62 that moves vertically via an engagement mechanism 64, for example, to engage (and disengage) a driver tip 66 from the clamp bolts arranged on the periphery of a cutter head, and rotates to tighten or loosen the bolts. Preferably, the vertical movement of the driver tip 66 is defined between a raised (disengaged) position and a lowered (engaged) position under the control of the machine computer. The torque spindle 62 is driven by a torque driver system (such as that commercially available from Bosch-Rexroth, for example) that controls the speed, direction and tightening (loosening) torque profiles.

When a cutter head is positioned in spindle 30, the drive tip 66 is manually positioned ($X_2, Y_2, Z_2$) to engage a clamp bolt of the cutter head (FIG. 9) and those axes positions are locked such that only incremental rotation of the spindle 30 is needed to index the cutter in order to bring subsequent clamp bolts into position for engagement by the driver tip. The angular increment of rotation of the cutter head necessary to position each clamp bolt at driver tip 66 is either determined by the computer control of machine 22 (with appropriate input parameters) or programmed into the computer control. It should be noted that if more than one clamp bolt is present per cutting blade, the driver tip 66 is manually repositioned ($X_2, Y_2, Z_2$) to a different location so as to engage the second (or subsequent) clamp bolt after the first clamp bolt is loosened or tightened for all cutting blades. In other words, it is preferable to loosen/tighten all clamp bolts at a certain $X_2, Y_2, Z_2$ location before repositioning to another $X_2, Y_2, Z_2$ location so as to loosen/tighten another set of clamp bolts.

Figure 7:
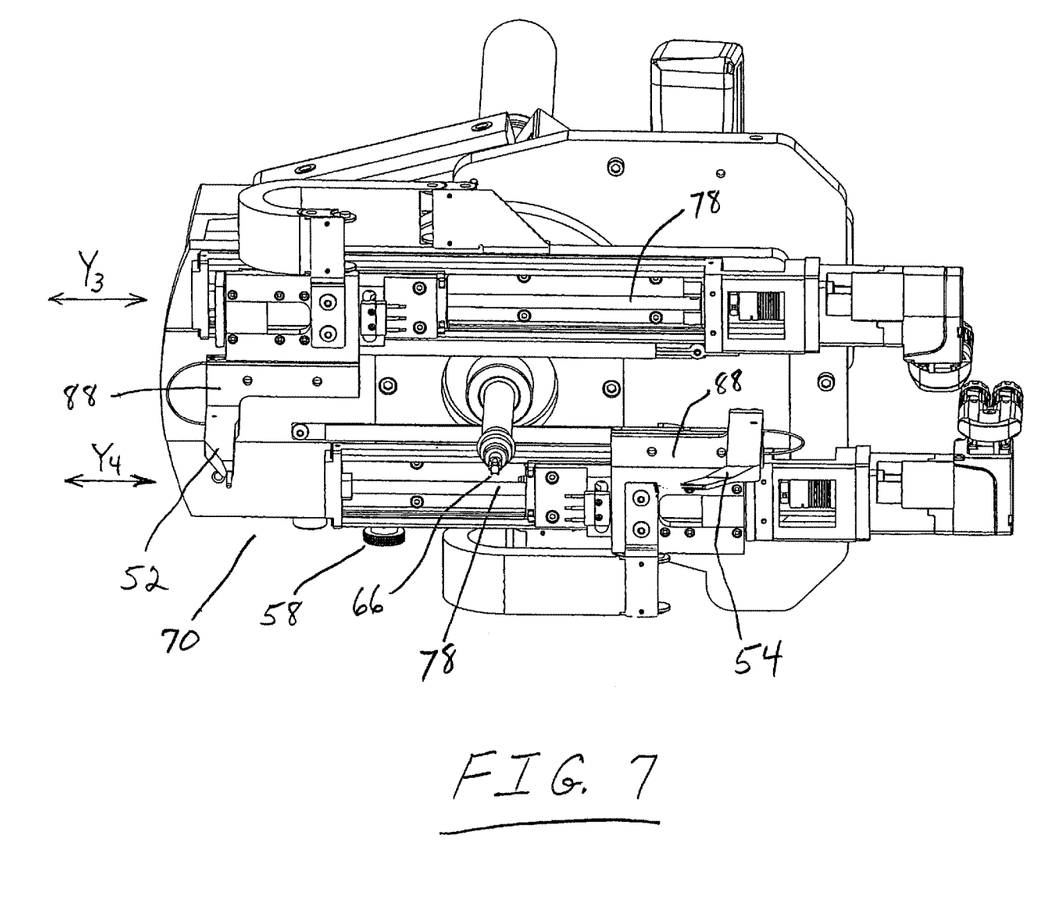
FIG. 7 is a view of the underside of the swivel plate of FIG. 6.
Figure 8:
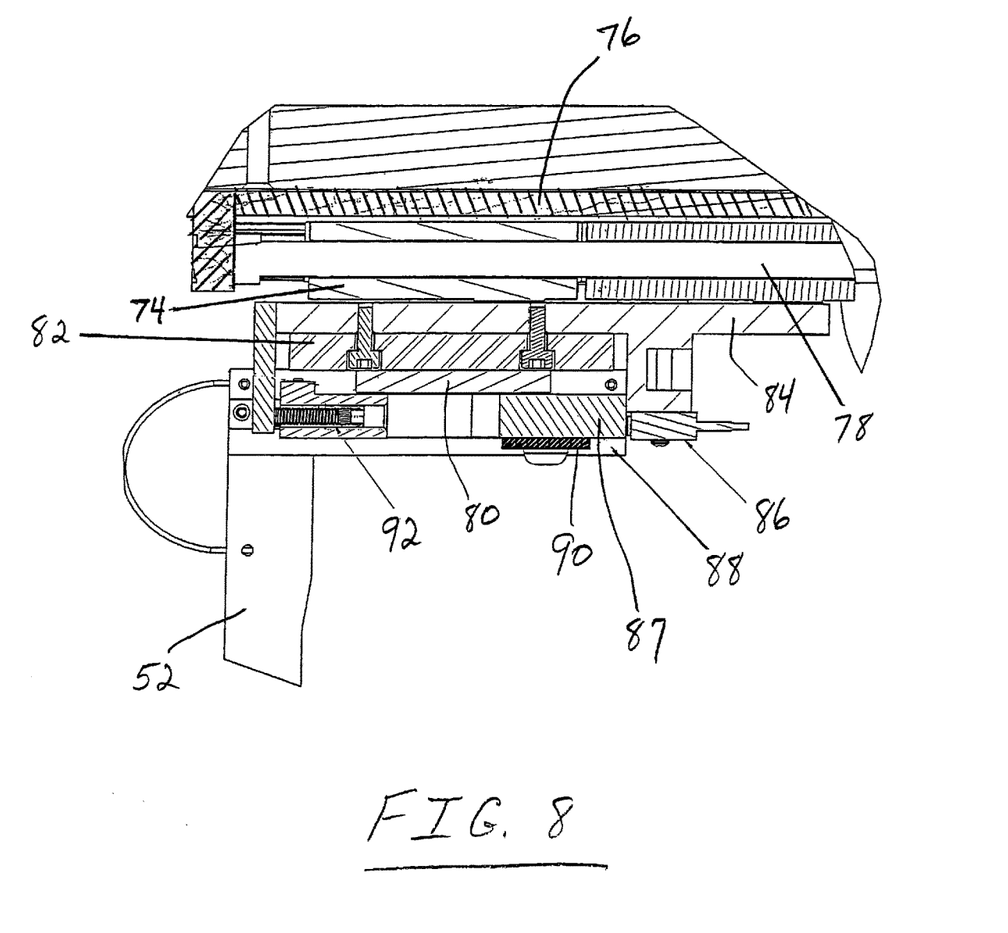
FIG. 8 is a cross-sectional view of the positioning system for a blade positioning arm.

FIGS. 7 and 8 show a blade positioning system 70 mounted to the underside of C-axis swivel plate 56 and comprising two linear axes of motion, $Y_3$ and $Y_4$, one for each of blade positioning arms 52 and 54. Motion along each linear axis $Y_3$ and $Y_4$ is preferably effected by a primary slide 74 mounted to rail 76 and driven by a ball screw 78. In between each arm 52, 54 and its respective primary slide 74 there is preferably a secondary compliance slide 80 mounted to a secondary rail 82 that is located on an underside of mounting plate 84 which, in turn, is attached to primary slide 74. The primary slide—secondary compliance slide arrangement allows for a small amount (e.g. about 1 mm) of over travel when a respective blade arm 52, 54 contacts a cutting blade, thereby allowing a switch 86 to be actuated (i.e. contact between switch 86 and contact block 87 is broken) thus indicating that the arm 52, 54 has contacted a cutting blade. Under non-contacting conditions, spring 92 provides the force necessary to maintain contact between switch 86 and contact block 87.

Blade arms 52, 54 are each attached to their respective secondary slide 80 via brackets 88 which preferably include a break-away mechanism, such as one or more rare earth magnets (not shown) located between the contact block 87 and bracket 88 to allow for break away if the force on the arms 52, 54 exceeds predetermined limits. If desired, the tip of the blade contact arms 52, 54 may be coated or plated with an abrasive substance to enhance gripping of a cutting blade.

Figure 9:
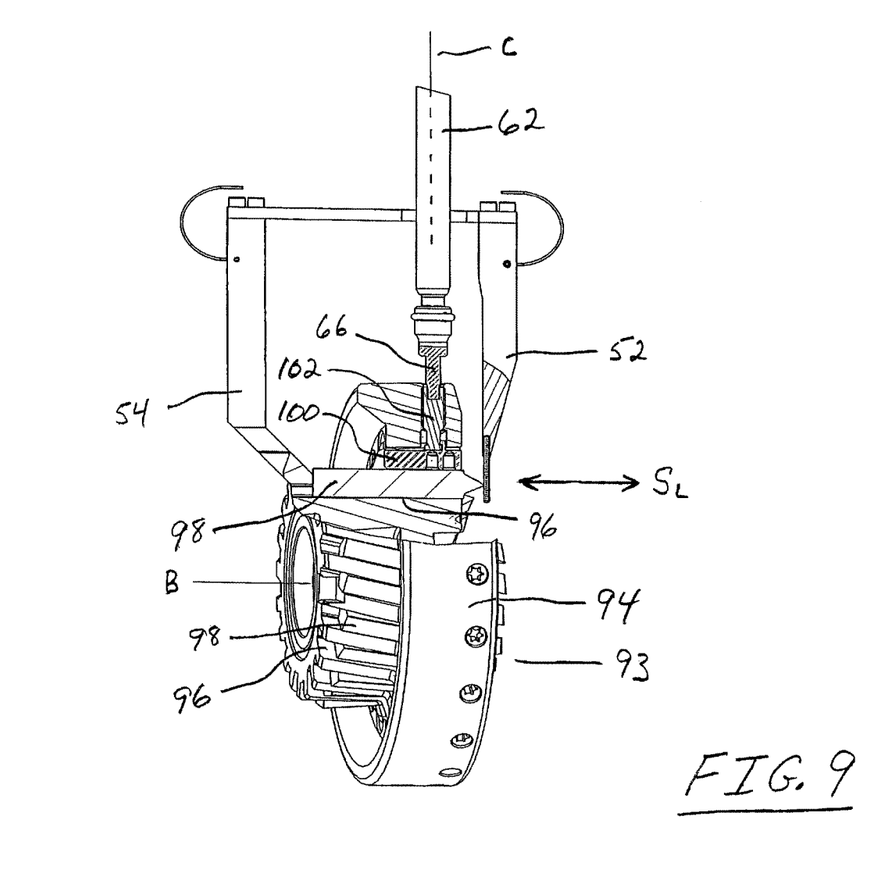
FIG. 9 is a cut-away view showing a cutting blade engaged by blade positioning arms and a torque driver engaging a clamp bolt.

FIG. 9 shows a cutting tool 93 comprising a cutter head 94 having a plurality of blade mounting slots 96 extending linearly between the front and back sides of the cutter head with each slot 96 having a clamp block 100 and at least one clamp screw 102. A cutting blade 98 is located in each mounting slot 96. The cutter 93 is positioned relative to arms 52, 54 for cutter building and/or truing (i.e. cutter 93 being located on spindle 30 of machine 22 (FIG. 3) for angular movement about axis B). A portion of the cutter 93 has been cut away so as to allow for illustration. Arms 52, 54 are aligned with the lengthwise direction of cutting blade 98 by angularly adjusting swivel plate 56. Once aligned, arms 52, 54 are moved toward one another to contact blade 98. It should be noted that if cutting blade 98 is not clamped and contact by arms 52, 54 is not simultaneous, the first-contacting arm will push the cutting blade toward the other arm until contact occurs thereby activating respective switched 86 for each arm 52, 54. Of course, if cutting blade 98 is clamped, the respective switch 86 for each arm 52, 54 will activate upon contact by the respective arm. Cutting blade 98 may them be moved in either direction along the lengthwise direction of the slot 96.

In a preferred method, the spindle 30 of machine 22 is loaded with an empty cutter head 94 and then cutting blades 98 are inserted into respective slots 96 in the head. The loading of the empty cutter head and/or the inserting of the cutting blades may be done manually or automatically such as with a robot. Alternatively, an assembled cutter head (i.e. cutter head 94 with blades 98 positioned therein) may be loaded on the machine. In either case, the machine automatically clamps each blade via torque spindle 62 and driver tip 66 (if not already done prior to loading) and determines its position via measurement subsystem 26 (FIG. 3).

The machine (via driver tip 66 and incremental rotation of spindle 30 for indexing to successive clamp bolt positions) then automatically loosens each blade and positions the blade as specified by the operator. Blade positioning arms 52, 54 engage a blade at both the base and the top relief angle (preferably just behind the tip) with the purpose of moving a blade in either direction along the lengthwise direction of the slot ($S_L$) so as to properly position the cutting blade 98 in the cutter head 94. The cutting blades are automatically clamped by driver tip 66 to an appropriate torque and the position of each blade is confirmed after clamping such as by measurement subsystem 26 wherein probe 36 preferably contacts at least one of the tip and the pressure side surface of each cutting blade. If necessary, the position of any cutting blade may be readjusted as needed to account for any movement during clamping. The final position information for each cutting blade of the completed head is stored in the machine computer or elsewhere as preferred by the operator.

If desired, the above method may further include the display all appropriate build parameters and allow user modification within reasonable (e.g. pre-set) ranges. The method may also include slot by slot modifications of blade type, nominal, offset, blade present, clamp screw torque, etc. The machine and process can automatically build a cutter head and then display, print and store the resulting cutter information.

The invention further comprises the machine being capable to provide one or more of the following:

recommended cutter head maintenance. The recommendation is preferably based on data collected over multiple build cycles and simple algorithms (e.g. M consecutive occurrences or N occurrences in a specified number of cutter builds).

modified initial blade target positions on a slot by slot basis, using historical blade displacement information for a given slot.

time estimates for various portions of the cycle based on individual historical head and slot build times.

time remaining on current cycle, available at all times in the cycle.

a clock time when operator is required next with a message sent (e.g. sms) if possible.

use of standard data and default values to automatically build head. Display, print and store results (i.e. a "wizard" approach to build heads such as for operators of lesser skill level).

post build—allow slot by slot changes to blade offsets versus measured position.

on a pre-built cutter—measure a selected blade to establish nominal (master) position, then index to each successive blade position and measure axial and radial positions. Machine prompts for changing position of cutting blade (as appropriate).

replace a blade within a given cycle.

replace a blade (built cutter)—recall build data if possible, measure previous master blade to determine any offset (mounting, temperature, etc.), enter bad blades numbers to be replaced. If desired, re-measure each remaining blade in entire head for axial and radial positioning. Machine prompts for changing position of cutting blades (as appropriate).

The inventive machine may also provide for self-checking such as measuring the spindle 30 and/or measuring any adapters utilized with the spindle. The cutter head, or certain aspects thereof, may also be measured by the measurement subsystem 26. Runout (axial and/or radial) of the cutter head may be measured. The measurement system may be utilized to enable the machine to "learn" previously unknown (i.e. no data residing in the machine) cutter heads.

The inventive machine is preferably capable of receiving cutter information (e.g. blade geometry, cutter geometry, nominal build values, acceptable build tolerances, build process data at a slot level, etc.) via RFID chip, barcode (including 2D barcode) located on the cutter head or on associated packaging, other measurement and/or analysis software (e.g. GEMS commercially available from The Gleason Works, Rochester, N.Y.), and, of course, via manual input. Additionally, the machine is preferably compatible with remote diagnostic services (e.g. Gleason Connect commercially available from The Gleason Works, Rochester, N.Y.).

Alternatively, one or more of axes $X_2$, $Y_2$, $Z_2$, and C may be motor driven and positioned, separately or simultaneously, via computer (e.g. CNC) control. In this alternative embodiment, one of the blade positioning arms 52, 54 may be stationary (i.e. fixed in position, for example, a hard stop).

While the invention has been described with reference to preferred embodiments it is to be understood that the invention is not limited to the particulars thereof. The present invention is intended to include modifications which would be apparent to those skilled in the art to which the subject matter pertains without deviating from the spirit and scope of the appended claims.

What is claimed is:

1. A cutter build and truing machine comprising:
a machine base;
a cutter head spindle rotatable about a spindle axis B;
a build carriage subsystem comprising a pair of blade positioning arms relatively movable toward and away from one another in a linear direction, said blade positioning arms being positionable for contacting a cutting blade at opposite lengthwise ends thereof, said blade positioning arms being further movable so as to position said cutting blade in a blade mounting slot of a cutter head releasably mountable on said cutter head spindle, said blade mounting slot extending in a lengthwise direction and said blade positioning arms being capable of moving said cutting blade in either direction along said lengthwise slot direction; and
a driver tip in communication with a torque spindle, said driver tip being capable of engaging with and disengaging from a blade clamp bolt in said cutter head, said driver tip being operable to tighten said blade clamp bolt for securing a cutting blade in said blade mounting slot of said cutter head and also being capable of loosening said clamp bolt whereby said cutting blade is movable in said lengthwise direction of said blade mounting slot.

2. The cutter build and truing machine of claim 1 wherein said driver tip and torque spindle are located in said build carriage subsystem.

3. The cutter build and truing machine of claim 1 wherein said build carriage subsystem is positionable along three mutually perpendicular linear axes ($X_2$, $Y_2$, $Z_2$).

4. The cutter build and truing machine of claim 1 wherein said blade positioning arms are angularly adjustable about a swivel axis C.

5. The cutter build and truing machine of claim 1 wherein said blade positioning arms are located on a swivel plate.

6. The cutter build and truing machine of claim 5 wherein said pair of positioning arms are linearly movable relatively toward and away from one another in a linear direction on the underside of said swivel plate, each of said pair of positioning arms being linearly movable along a linear axis ($Y_3$, $Y_4$) to effect said linear movement toward and away from one another.

7. The cutter build and truing machine of claim 6 wherein each positioning arm is linearly movable via a primary slide mounted to a rail positioned on said swivel plate.

8. The cutter build and truing machine of claim 7 further comprising a secondary compliance slide mounted to a secondary rail wherein said secondary compliance slide and said secondary rail are located between each of said positioning arms and a respective said primary slide.

9. The cutter build and truing machine of claim 1 wherein said swivel axis C extends in a vertical direction and is oriented perpendicular to cutter head spindle axis B.

10. The cutter build and truing machine of claim 1 wherein said driver tip is linearly movable in a vertical direction.

11. The cutter build and truing machine of claim 1 wherein said blade positioning arms are angularly adjustable about a swivel axis C wherein said driver tip and torque spindle are arranged along said swivel axis C.

12. The cutter build and truing machine of claim 1 further comprising a measurement subsystem comprising a measuring probe.

13. The cutter build and truing machine of claim 12 wherein said probe is positionable along three mutually perpendicular linear axes ($X_1$, $Y_1$, $Z_1$).

14. The cutter build and truing machine of claim 1 wherein motion along linear axes ($X_2$, $Y_2$, $Z_2$) and about swivel axis C is effected manually.

15. The cutter build and truing machine of claim 14 wherein each of said linear axes ($X_2$, $Y_2$, $Z_2$) includes a braking mechanism to hold each of said linear axes in a respective working position.

16. The cutter build and truing machine of claim 14 wherein said swivel axis C includes a locking mechanism to hold said swivel axis in a working position, said swivel axis being further adjustable for precision rotation about said swivel axis.

17. The cutter build and truing machine of claim 1 wherein each of said positioning arms includes a break-away mechanism whereby each of said positioning arms is separable from said swivel plate if a force on said positioning arms exceeds a predetermined limit.

18. A method of building and truing a cutter, said method comprising:
    releasably mounting a cutter head on a rotatable cutter head spindle of a cutter build and truing machine, said cutter head having a plurality of cutting blade mounting slots located therein with each of said mounting slots extending linearly in a direction through said cutter head from a first side to a second side, each of said mounting slots having a clamping mechanism comprising a clamp bolt, said clamping mechanism being operable to clamp a cutting blade in said mounting slot and to release a cutting blade from a clamped condition in said mounting slot,
    providing a cutting blade in at least one of said cutting blade mounting slots, said cutting blade being in the form of a bar extending lengthwise between opposed ends,
    determining the position of said cutting blade in said at least one mounting slot,
    releasing said cutting blade from a clamped condition, said clamp bolt being retracted to effect said releasing by engaging said clamp bolt with a driver tip located on said cutter build and truing machine,
    contacting each end of said cutting blade with a respective positioning arm of said cutter build and truing machine,
    moving the positioning arms to effect movement of said cutting blade linearly in the direction of said blade mounting slot to locate said cutting blade in a desired position, the positioning arms being operable to move said cutting blade back and forth along said linear direction,
    securing said cutting blade in said desired position by clamping with said clamping mechanism, said clamp bolt being advanced to effect clamping by engaging said clamp bolt with said driver tip located on said cutter build and truing machine.

19. The method of claim 18 wherein said determining the position of said cutting blade in said at least one mounting slot is effected by a measurement system located on said cutter build and truing machine.

20. The method of claim 18 wherein a machine position of said driver tip for engaging said clamp bolt is maintained for subsequent clamp bolts of respective subsequent blade mounting slots in said cutter head, said subsequent blade mounting slots being presented to said driver tip by indexing said cutter head by said rotatable cutter head spindle.

* * * * *